United States Patent
Sato et al.

(10) Patent No.: US 6,176,438 B1
(45) Date of Patent: Jan. 23, 2001

(54) SUCK BACK VALVE HAVING SENSOR FOR DETECTING DIAPHRAGM DISPLACEMENT AMOUNT

(75) Inventors: Akio Sato, Soka; Tetsuro Maruyama, Ibaraki-ken; Yuji Tsuda, Kashiwa, all of (JP)

(73) Assignee: SMC Kabushiki Kaisha (JP)

(*) Notice: Under 35 U.S.C. 154(b), the term of this patent shall be extended for 0 days.

(21) Appl. No.: 09/385,092

(22) Filed: Aug. 30, 1999

(30) Foreign Application Priority Data

Aug. 31, 1998 (JP) .................................................. 10-244600

(51) Int. Cl.[7] ........................................................ B05B 15/02
(52) U.S. Cl. ............................. 239/119; 239/73; 239/106; 239/586; 222/571; 251/30.02; 251/63.5; 251/331
(58) Field of Search ........................... 239/71, 73, 104, 239/106, 119, 583, 586; 251/30.02, 63.5, 331; 222/571

(56) References Cited

U.S. PATENT DOCUMENTS

| | | | |
|---|---|---|---|
| 3,895,748 | * 7/1975 | Klingenberg | 222/571 |
| 4,394,945 | * 7/1983 | Taylor, Jr. | 222/571 |
| 4,597,719 | * 7/1986 | Tano | 222/571 X |
| 5,134,962 | * 8/1992 | Amada et al. | 239/71 X |
| 5,423,482 | * 6/1995 | Mueller et al. | 239/119 X |
| 5,927,605 | * 7/1999 | Odajima et al. | 239/119 |

FOREIGN PATENT DOCUMENTS 8-10399 * 3/1996 (JP) .

* cited by examiner

Primary Examiner—Andres Kashnikow
Assistant Examiner—Steven J Ganey
(74) Attorney, Agent, or Firm—Paul A. Guss

(57) ABSTRACT

A suck back valve comprises an ON/OFF valve, a suck back mechanism, a first sensor for detecting a displacement amount of a first diaphragm of the ON/OFF valve, and a second sensor for detecting a displacement amount of a second diaphragm corresponding to a suction amount of a coating liquid. The suck back valve further comprises a control unit for feedback-controlling the valve displacement speed of the ON/OFF valve and the suction amount of the coating liquid on the basis of detection signals obtained by the first sensor and the second sensor respectively.

15 Claims, 7 Drawing Sheets

PRIOR ART

SUCK BACK VALVE HAVING SENSOR FOR DETECTING DIAPHRAGM DISPLACEMENT AMOUNT

BACKGROUND OF THE INVENTION

1. Field of the Invention

The present invention relates to a suck back valve for sucking a predetermined amount of fluid flowing through a fluid passage in accordance with a displacement action of a diaphragm so that any liquid drip may be avoided, for example, at a supply port for the fluid.

2. Description of the Related Art

The suckback valve has been hitherto used, for example, in the production steps for semiconductor wafers or the like. The suck back valve has a function to avoid so-called liquid drip in which a trace amount of coating liquid drips from the supply port toward the semiconductor wafer when the supply of the coating liquid is stopped for the semiconductor wafer.

A suck back valve concerning the conventional technique is shown in FIG. 7 (see, for example, Japanese Utility Model Publication No. 8-10399).

The suck back valve 1 comprises a main valve body 5 formed with a fluid passage 4 for making communication between a fluid inlet port 2 and a fluid outlet port 3, and a bonnet 6 joined to an upper portion of the main valve body 5. A diaphragm 7, which is composed of a thick-walled section and a thin-walled section, is provided at a central portion of the fluid passage 4. The bonnet 6 is formed with a pressure fluid supply port 8 connected to an unillustrated pressure fluid supply source, for supplying compressed air for operating the diaphragm in accordance with the switching action of a selector valve (not shown).

A piston 9 is fitted to the diaphragm 7. A v-packing 10, which slides on the inner wall surface of the main valve body 5 and which functions as a seal, is installed to the piston 9. A spring 11 for always pressing the piston 9 upwardly is provided in the main valve body 5.

A screw member 12 is provided at an upper portion of the bonnet 6, for making abutment against the piston 9 in accordance with the action of increasing or decreasing the screwing amount to adjust the displacement amount of the piston 9 so that the flow rate of the coating liquid sucked by the diaphragm 7 is adjusted.

A coating liquid supply source 13 for storing the coating liquid is connected to the fluid outlet port 2 via a tube passage 14 such as a tube. An ON/OFF valve 15, which is constructed separately from the suck back valve 1, is connected between the coating liquid supply source 13 and the fluid inlet port 2. The ON/OFF valve 15 functions to make changeover between the supply state and the supply stop state of the coating liquid with respect to the suck back valve 1 in accordance with its energizing/deenergizing action thereof.

The operation of the suck back valve 1 will be schematically described. In an ordinary state, the coating liquid is supplied from the fluid inlet port 2 to the fluid outlet port 3. In this state, the piston 9 and the diaphragm 7 are displaced downwardly in an integrated manner in accordance with the action of the compressed air supplied from the pressure fluid supply port 8. The diaphragm 7, which is coupled to the piston 9, protrudes into the fluid passage 4 as shown by two-dot chain lines in FIG. 7.

When the flow of the coating liquid in the fluid passage 4 is stopped in accordance with the switching action of the ON/OFF valve 15, the supply of the compressed air from the pressure fluid supply port 8 is stopped. Accordingly, the piston 9 and the diaphragm 7 are lifted upwardly in an integrated manner in accordance with the action of the resilient force of the spring 11. A predetermined amount of the coating liquid, which remains in the fluid passage 4, is sucked in accordance with the action of negative pressure effected by the diaphragm 7. Thus, any liquid drip is avoided at an unillustrated supply port.

In this case, the suction amount of the coating liquid corresponds to the displacement amount of the piston 9. The displacement amount of the piston 9 is adjusted by the screw member 12.

The suck back valve 1 concerning the conventional technique described above includes a fluid pressure control unit 17 which is connected to the pressure fluid supply port 8 via a tube member 16 such as a tube in order to highly accurately control the flow rate of the compressed air supplied to the pressure fluid supply port 8.

However, in the case of the suck back valve 1 concerning the conventional technique described above, the suction amount of the coating liquid is adjusted manually by a skilled operator by increasing or decreasing the screwing amount of the screw member 12. For this reason, an inconvenience arises in that the suction amount of the coating liquid cannot be controlled highly accurately. In this case, the screwing amount of the screw member 2, which has been once set, has to be manually adjusted by the operator at each time corresponding to the supply amount of the coating liquid. Such an operation is complicated as well.

When the suck back valve 1 concerning the conventional technique is used, it is necessary to perform the piping connection operation between the suck back valve 1 and the fluid pressure control unit 17 and between the suck back valve 1 and the ON/OFF valve 15. Such an operation is complicated, and it is necessary to prepare an exclusive space for additionally providing the fluid pressure control unit 17 and the ON/OFF valve 15 other than the suck back valve 1. Therefore, an inconvenience arises in that the installation space is increased.

Another inconvenience arises as follows. That is, the flow passage resistance is increased due to the piping connected between the suck back valve 1 and the fluid pressure control unit 17. For this reason, the response accuracy of the diaphragm is deteriorated.

Still another inconvenience arises as follows. That is, an unillustrated driving unit is separately required to make changeover between the ON state and the OFF state of the ON/OFF valve 15. The piping connection operation is complicated between the ON/OFF valve 15 and the driving unit, and the cost becomes expensive.

SUMMARY OF THE INVENTION

A general object of the present invention is to provide a suck back valve which makes it possible to highly accurately control the pilot pressure and the flow rate of the pressure fluid to be sucked.

A principal object of the present invention is to provide a suck back valve which makes it possible to avoid the piping connection operation and reduce the installation space.

Another object of the present invention is to provide a suck back valve which makes it possible to improve the response accuracy of the diaphragm.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

Figure 1:
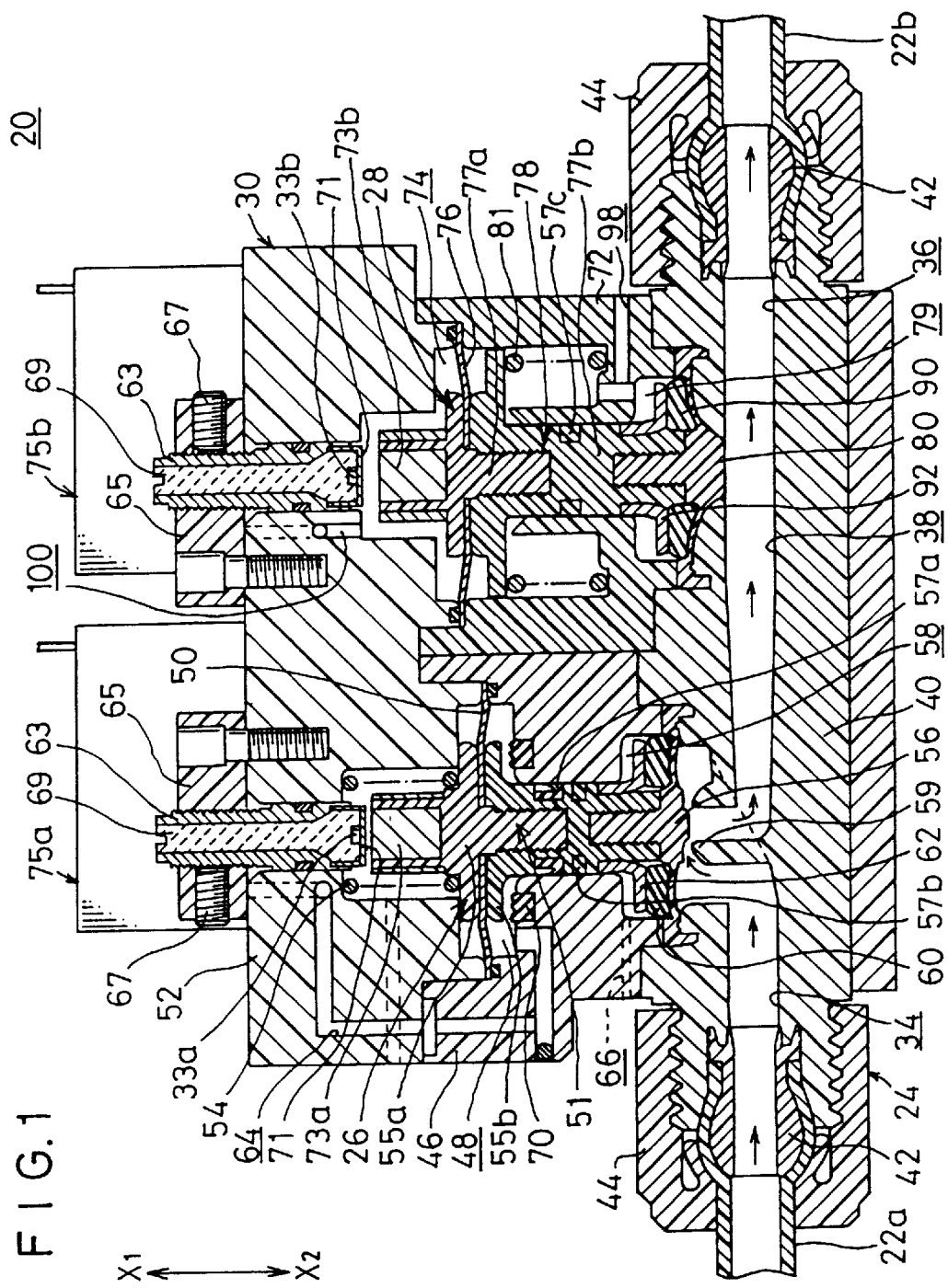
FIG. 1 shows a longitudinal sectional view illustrating a suck back valve according to an embodiment of the present invention.

With reference to FIG. 1, reference numeral 20 indicates a suck back valve according to an embodiment of the present invention. The suck back valve 20 comprises a joint section 24 including a pair of tubes 22a, 22b connected detachably while being separated from each other by a predetermined spacing distance, and a valve-driving section 30 provided on the joint section 24 and including therein an ON/OFF valve 26 and a suck back mechanism 28.

Figure 3:
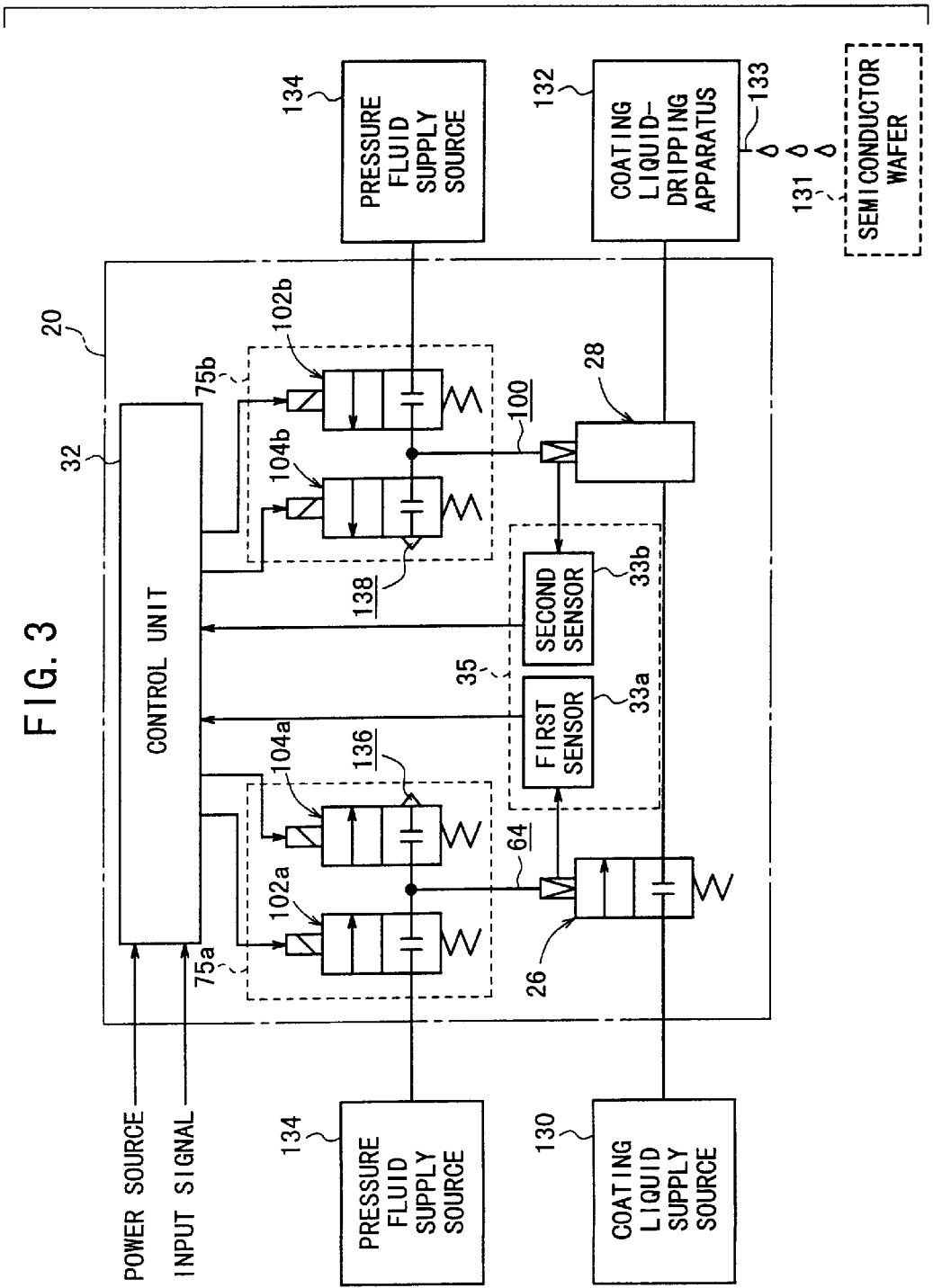
FIG. 3 shows a circuit arrangement of the suck back valve shown in FIG. 1.

As shown in FIG. 3, the suck back valve 20 comprises a control unit 32 for controlling the pressures (pilot pressures) of the pressure fluid supplied to the ON/OFF valve 26 and the suck back mechanism 28 respectively, and a detecting unit 35 including a first sensor (another displacement amount-detecting means) 33a for detecting the displacement amount (valve lift amount) of the ON/OFF valve 26, and a second sensor (displacement amount-detecting means) 33b for detecting the displacement amount (valve lift amount) of the suck back mechanism corresponding to the suction amount of the fluid. The joint section 24, the valve-driving section 30, the control unit 32, and the detecting unit 35 are assembled in an integrated manner.

As shown in FIG. 1, the joint section 24 comprises a first port 34 which is formed at one end, and a second port 36 which is formed at the other end. The joint section 24 further comprises a joint body 40 provided with a fluid passage 38 for making communication between the first port 34 and the second port 36, inner members 42 for making engagement with the first port 34 and the second port 36 respectively and being inserted into openings of tubes 22a, 22b, and lock nuts 44 for holding the liquid-tight state at connecting portions of the tubes 22a, 22b by being screwed into screw grooves formed at the ends of the joint body 40.

Sealing is effected for the joint section 24 at only portions substantially parallel to the axis of the tubes 22a, 22b, and sealing is not effected at portions intersecting with the axis.

The ON/OFF valve 26 is arranged on the joint section 24 in the vicinity of the first port 34. The ON/OFF valve 26 comprises a first valve body 46 which is integrally joined to the joint body 40, a diaphragm 50 which is provided in a stretched manner in a chamber 48 formed at the inside of the first valve body 46 and which is displaceable in the direction of the arrow $X_1$ or $X_2$, a first displacement member 51 which is displaceable integrally with the diaphragm 50, and a cover member 52 for closing the chamber 48 in an airtight manner.

The chamber 48 is divided by the diaphragm 50 into an upper chamber 48 and a lower chamber 48. The following description will be made assuming that the lower chamber 48, to which the pressure fluid is supplied via a first pilot passage 64 as described later on, is the first diaphragm chamber 48.

The first displacement member 51 includes first and second interposing members 55a, 55b which are joined to one another via a hole formed at a central portion of the diaphragm 50, for interposing upper and lower surfaces of the diaphragm 50 respectively. A first seal member 57a and a second seal member 57b are installed to a shaft section of the second interposing member 55b by the aid of annular grooves.

A spring member 54 is interposed between the first interposing member 55a and the cover member 52. The first displacement member 51 is in a state of being always energized downwardly (in the direction of the arrow $X_2$) by the aid of the resilient force of the spring member 54. Therefore, the ON/OFF valve 26 is constructed as the normally closed type.

A chamber 58, which is closed by a first diaphragm 56, is formed on the lower end side of the first displacement member 51. The first diaphragm 56 is provided such that it is coupled to the lower end of the shaft section of the second interposing member 55b and it makes displacement integrally with the first displacement member 51.

The first diaphragm 56 is composed of a thick-walled section formed at an approximately central portion, and a thin-walled section formed continuously at the circumference thereof. In this embodiment, the first diaphragm 56 is separated from a seat section 59 formed on the joint body 40, or it is seated on the seat section 59. Thus, the first diaphragm 56 functions as a valve plug for opening/closing the fluid passage 38.

Therefore, the supply state and the supply stop state are switched for the pressure fluid (for example, a coating liquid) flowing through the fluid passage 38 in accordance with the opening/closing action of the ON/OFF valve 26.

A ring-shaped buffer member 60 for protecting the thin-walled section of the first diaphragm 56 is provided on the upper surface of the first diaphragm 56. The buffer member 60 is held by a holding member 62 having an L-shaped cross section joined to the lower end of the second interposing member 55b.

A screw member 63 is fitted and inserted along a through-hole of the cover member 52 on the upper side of the first displacement member 51. The screw member 63 is fastened by a fastening screw 67 to a block member 65 which is fixed to an upper portion of the cover member 52. A rod-shaped member 69, which is formed of a ceramic material, is internally fitted to the screw member 63. A first sensor 33a, which is formed, for example, by a Hall element, is held by a cap-member 71 at the bottom of the rod-shaped member 69.

The first sensor 33a functions such that it detects the magnetic force of a first magnet 73a installed to an upper surface hole of the first displacement member 51, and thus it detects the displacement amount of the first displacement member 51. The first diaphragm 56 makes displacement integrally with the first displacement member 51. Accordingly, the displacement amount of the first displacement member 51 corresponds to the displacement amount of the first diaphragm 56. Therefore, the valve lift amount of the first diaphragm 56 which functions as the valve plug of the ON/OFF valve 26 can be directly detected by detecting the displacement amount of the first displacement member 51 by using the first sensor 33*a*.

The first valve body 46 is formed with a first pilot passage 64 for making communication between the first diaphragm chamber 48 of the ON/OFF valve 26 and a first electropneumatic proportional valve 75*a* described later on. In this embodiment, the pressure fluid (pilot pressure) is supplied into the first diaphragm chamber 48 via the first pilot passage 64 in accordance with the control action of the first electropneumatic proportional valve 75*a*. Thus, the first displacement member 51 is lifted upwardly against the resilient force of the spring member 54. Therefore, the first diaphragm 56 is separated by a predetermined spacing distance from the seat section 59, and thus the fluid passage 38 is open. Accordingly, the coating liquid flows from the first port 34 toward the second port 36.

The first valve body 46 is formed with a passage 66 for making communication between the chamber 58 and the atmospheric air. The air is supplied to or discharged from the interior of the chamber 58 via the passage 66. Thus, it is possible to smoothly operate the first diaphragm 56. Reference numeral 70 indicates a buffer member which abuts against the flange of the second interposing member 55*b* to effect the buffering action.

The suck back mechanism 28 is provided on the joint section 24 in the vicinity of the second port 36. The suck back mechanism 28 comprises a second valve body 72 which is integrally joined to the joint body 40 and the first valve body 46, a diaphragm 76 which is provided in a stretched manner in a chamber 74 formed at the inside of the second valve body 72 and which is displaceable in the direction of the arrow $X_1$ or $X_2$, a second displacement member 78 which is displaceable integrally with the diaphragm 76, and the cover member 52 for closing the chamber 74 in an air-tight manner.

The chamber 74 is divided by the diaphragm 76 into an upper chamber 74 and a lower chamber 74. The following description will be made assuming that the upper chamber 74, to which the pressure fluid is supplied via a second pilot passage 100 as described later on, is the second diaphragm chamber 74.

The second displacement member 78 includes first and second interposing members 77*a*, 77*b* which are joined to one another via a hole formed at a central portion of the diaphragm 76, for interposing upper and lower surfaces of the diaphragm 76 respectively. A third seal member 57*c* is installed to a shaft section of the second interposing member 77*b* via annular grooves.

A chamber 79, which is closed by a second diaphragm 80, is formed on the lower end side of the second displacement member 78. The second diaphragm 80 is provided such that it is coupled to the lower end of the shaft section of the second interposing member 77*b* and it makes displacement integrally with the second displacement member 78. The second diaphragm 80 is composed of a thick-walled section formed at an approximately central portion, and a thin-walled section formed continuously at the circumference thereof.

A spring member 81, which is fastened to the flange of the second interposing member 77*b*, for always energizing the second displacement member 78 upwardly (direction indicated by the arrow $X_1$) in accordance with the resilient force thereof, is arranged in the chamber 79.

A screw member 63 is fitted and inserted along a through-hole of the cover member 52 on the upper side of the second displacement member 78. The screw member 63 is fastened by a fastening screw 67 to a block member 65 which is fixed to an upper portion of the cover member 52. A rod-shaped member 69, which is formed of a ceramic material, is internally fitted to the screw member 63. A second sensor 33*b*, which is formed, for example, by a Hall element, is held by a cap member 71 at the bottom of the rod-shaped member 69.

The second sensor 33*b* functions such that it detects the magnetic force of a second magnet 73*b* installed to an upper surface hole of the second displacement member 78, and thus it detects the displacement amount of the second displacement member 78. The second diaphragm 80 makes displacement integrally with the second displacement member 78. Accordingly, the displacement amount of the second displacement member 78 corresponds to the displacement amount of the second diaphragm 80. Therefore, the valve lift amount of the second diaphragm 80 which sucks the fluid in accordance with the displacement action of the second displacement member 78, can be directly detected by detecting the displacement amount of the second displacement member 78 by using the second sensor 33*b*.

A ring-shaped buffer member 90 for protecting the thin-walled section of the second diaphragm 80 is provided on the upper surface of the second diaphragm 80. The buffer member 90 is held by a holding member 92 having an L-shaped cross section joined to the lower end of the second displacement member 78.

The second valve body 72 is formed with a passage 98 for making communication between the chamber 79 and the atmospheric air. On the other hand, the cover member 52 is formed with a second pilot passage 100 for supplying the pilot pressure to the second diaphragm chamber 74.

The first electropneumatic proportional valve 75*a* for controlling the pilot pressure supplied to the first diaphragm chamber 48 of the ON/OFF valve 26, and a second electropneumatic proportional valve 75*b* for controlling the pilot pressure supplied to the second diaphragm chamber 74 of the suck back mechanism 28 are arranged on the cover member 52. The first electropneumatic proportional valve 75*a* functions as a speed control means, and the second electropneumatic proportional valve 75*b* functions as a suction amount control means.

As shown in FIG. 3, the first and second electropneumatic proportional valves 75*a*, 75*b* include first solenoid-operated valves 102*a*, 102*b* for air supply and second solenoid-operated valves 104*a*, 104*b* for air discharge respectively. The first solenoid-operated valves 102*a*, 102*b* and the second solenoid-operated valves 104*a*, 104*b* are composed of those of the normally closed type respectively. Current signals are sent to electromagnetic coils of the first solenoid-operated valves 102*a*, 102*b* and the second solenoid-operated valves 104*a*, 104*b* respectively from a controller 108 (see FIGS. 4 and 5) described later on. Thus, the unillustrated valve plugs are attracted to give the ON state.

The first electropneumatic proportional valve 75*a* functions to control the flow rate of the pressure fluid supplied from the pressure fluid supply source on the basis of the control signal (current signal) outputted from the controller 108 so that the pressure fluid (pilot pressure) controlled to have a predetermined pressure value is supplied to the first diaphragm chamber 48 of the ON/OFF valve 26.

On the other hand, the second electropneumatic proportional valve 75b functions to control the flow rate of the pressure fluid supplied from the pressure fluid supply source on the basis of the control signal (current signal) outputted from the controller 108 so that the pressure fluid (pilot pressure) controlled to have a predetermined pressure value is supplied to the second diaphragm chamber 74 of the suck back mechanism 28.

The control unit 32 includes the controller 108. The controller 108 is connected to the first electropneumatic proportional valve 75a and the second electropneumatic proportional valve 75b respectively. The controller 108 is provided with MPU (microprocessor unit) which functions as respective means of control, judgement, processing, calculation, and storage. The control signals sent from MPU are used to energize and deenergize the first solenoid-operated valves 102a, 102b and/or the second solenoid-operated valves 104a, 104b respectively. Thus, the pilot pressures (flow rates), which are supplied to the first diaphragm chamber 48 of the ON/OFF valve 26 and the second diaphragm chamber 74 of the suck back mechanism 28 respectively, are controlled.

Figure 5:
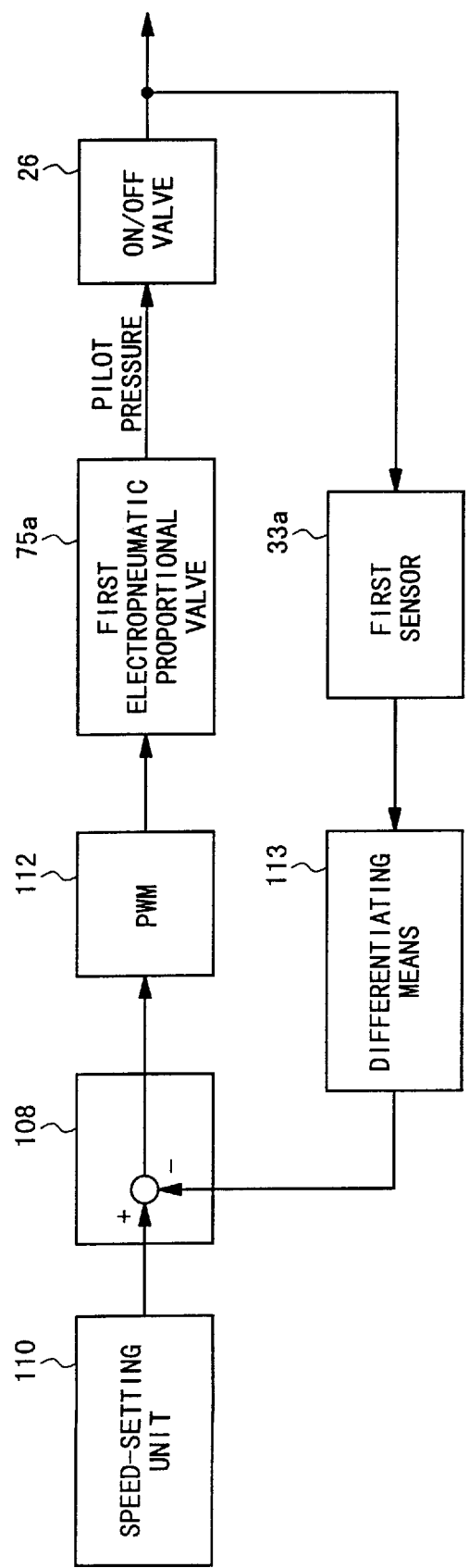
FIG. 5 shows a block diagram illustrating the feedback control for the valve displacement speed of an ON/OFF valve.

As shown in FIG. 5, the control unit 32 is provided with a speed-setting unit 110 for setting the displacement speed of the first diaphragm 56 of the ON/OFF valve 26, PWM 112 for modulating the pulse signal outputted from the controller 108, and a differentiating means 113 for differentiating the detection signal outputted from the first sensor 33a.

Figure 4:
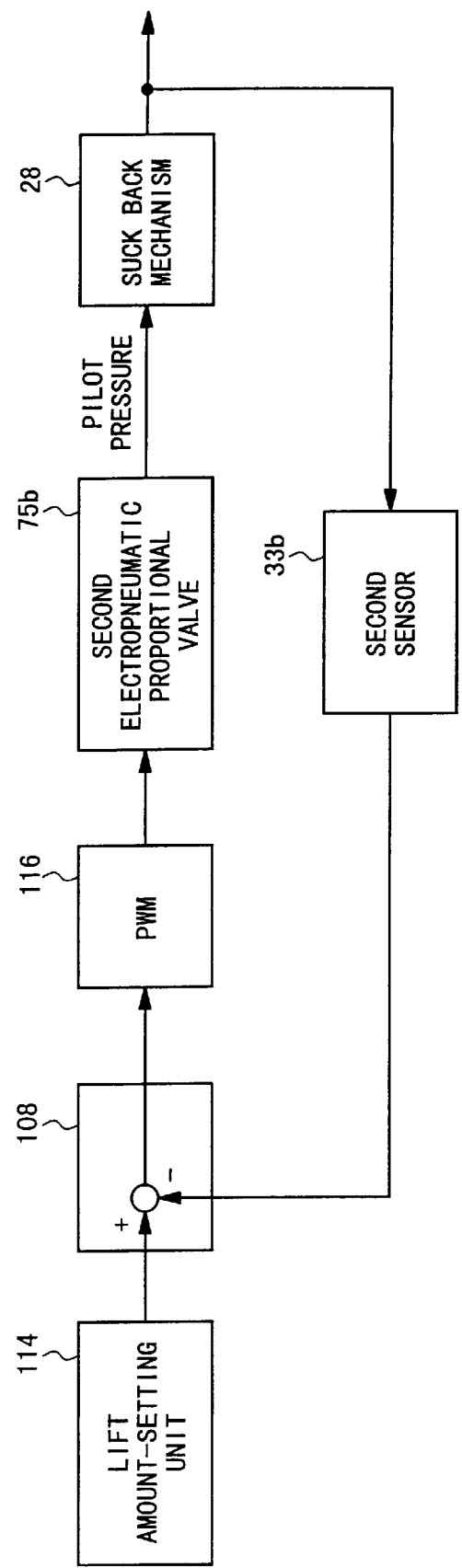
FIG. 4 shows a block diagram illustrating the feedback control for the suction amount by using a suck back mechanism.

As shown in FIG. 4, the control unit 32 is provided with a lift amount-setting unit 114 for setting the lift amount of the second diaphragm 76 of the suck back mechanism 28, and PWM 116 for modulating the pulse signal outputted from the controller 108.

The suck back valve 20 according to the embodiment of the present invention is basically constructed as described above. Next, its operation, function, and effect will be explained with reference to the circuit arrangement shown in FIG. 3.

At first, a coating liquid supply source 130, in which the coating liquid is stored, is connected to the tube 22a communicating with the first port 34 of the suck back valve 20. On the other hand, a coating liquid-dripping apparatus 132, which is provided with a nozzle 133 for dripping the coating liquid toward the semiconductor wafer 131, is connected to the tube 22b communicating with the second port 36. A common pressure fluid supply source 134 is previously connected to the first and second electropneumatic proportional valves 75a, 75b via unillustrated pressure fluid supply ports respectively.

After performing the preparatory operation as described above, the pressure fluid supply source 134 is energized to introduce the pressure fluid into the first and second electropneumatic proportional valves 75a, 75b via the unillustrated pressure fluid supply ports. Further, an unillustrated input means is used to introduce the input signal and the power source signal into the control unit 32.

The controller 108 of the control unit 32 sends an energizing signal to the first solenoid-operated valve 102b of the second electropneumatic proportional valve 75b on the basis of the input signal so that the first solenoid-operated valve 102b is in the ON state. Further, the control unit 32 sends a deenergizing signal to the second solenoid-operated valve 104b so that the second solenoid-operated valve 104b is in the OFF state.

In this embodiment, a pulse-shaped ON/OFF signal is inputted from the controller 108 to the first solenoid-operated valve 102b, and a pulse-shaped ON/OFF signal is inputted from the controller 108 to the second solenoid-operated valve 104b. The pulse-shaped ON/OFF signals are used to appropriately energize/deenergize the first solenoid-operated valve 102b for air supply and/or the second solenoid-operated valve 104b for air discharge respectively. Thus, the pressure fluid, which is supplied from the pressure fluid supply source 134, is controlled to have a predetermined pilot pressure.

The pilot pressure is supplied to the second diaphragm chamber 74 via the second pilot passage 100 communicating with the second electropneumatic proportional valve 75b. The diaphragm 76 is flexibly bent in accordance with the action of the pilot pressure, and the second displacement member 78 is pressed in the direction of the arrow $X_2$ against the resilient force of the spring member 81. As a result, the second diaphragm 80, which is coupled to the lower end of the second displacement member 78, is displaced downwardly to give the state shown in FIG. 1.

The controller 108 sends an energizing signal to the first solenoid-operated valve 102a of the first electropneumatic proportional valve 75a in the state in which the diaphragm 76 is pressed in the direction of the arrow $X_2$ in accordance with the action of the pilot pressure supplied to the second diaphragm chamber 74 as described above. Accordingly, the first solenoid-operated valve 102a is in the ON state. Further, the controller 108 sends a deenergizing signal to the second solenoid-operated valve 104a so that the second solenoid-operated valve 104 is in the OFF state.

In this embodiment, a pulse-shaped ON/OFF signal is inputted from the controller 108 to the first solenoid-operated valve 102a, and a pulse-shaped ON/OFF signal is inputted from the controller 108 to the second solenoid-operated valve 104a. The pulse-shaped ON/OFF signals are used to energize/deenergize the first solenoid-operated valve 102a for air supply and/or the second solenoid-operated valve 104a for air discharge respectively. Thus, the pressure fluid, which is supplied from the pressure fluid supply source, is controlled to have a predetermined pilot pressure.

The pilot pressure is supplied to the first diaphragm chamber 48 via the first pilot passage 64. The diaphragm 50 is flexibly bent in accordance with the action of the pilot pressure, and the first displacement member 51 is pressed in the direction of the arrow $X_1$ against the resilient force of the spring member 54. As a result, the first diaphragm 56, which is coupled to the lower end of the first displacement member 51, is displaced upwardly, and it is separated from the seat section 59 to give the valve-open state.

Therefore, the ON/OFF valve 26 is in the ON state. During this process, the coating liquid, which is supplied from the coating liquid supply source 130, flows along the fluid passage 38. The coating liquid is dripped onto the semiconductor wafer 131 by the aid of the coating liquid-dripping apparatus 132. As a result, a coating film (not shown) having a desired film thickness is formed on the semiconductor wafer 131.

After the predetermined amount of the coating liquid is applied to the semiconductor wafer 131 by the aid of the coating liquid-dripping apparatus 132, the controller 108 sends a deenergizing signal to the first solenoid-operated valve 102a of the first electropneumatic proportional valve 75a so that the first electropneumatic proportional valve 102 is in the OFF state. Further, the controller 108 sends an energizing signal to the second solenoid-operated valve 104a so that the second solenoid-operated valve 104a is in the ON state.

Therefore, the pressure fluid (pilot pressure), which remains at the inside of the first diaphragm chamber 48, passes through the first pilot passage 64, and it is discharged to the atmospheric air via a discharge port 136 of the second solenoid-operated valve 104a. Thus, the pilot pressure is decreased. As a result, the first displacement member 51 is displaced in the direction of the arrow $X_2$ in accordance with the action of the resilient force of the spring member 54, the first diaphragm 56 is seated on the seat section 59, and the ON/OFF valve 26 is in the OFF state.

When the ON/OFF valve 26 is in the OFF state, and the fluid passage 38 is blocked, then the supply of the coating liquid to the semiconductor wafer 131 is stopped to stop the dripping state of the coating liquid from the nozzle 133 of the coating liquid-dripping apparatus 132 to the semiconductor wafer 131. In this state, the coating liquid immediately before being dripped to the semiconductor wafer 131 remains in the nozzle 133 of the coating liquid-dripping apparatus 132. Therefore, it is feared that any liquid drip occurs.

Thus, the controller 108 sends a deenergizing signal to the first solenoid-operated valve 102b of the second electropneumatic proportional valve 75b so that the first solenoid-operated valve 102b is in the OFF state. Further, the controller 108 sends an energizing signal to the second solenoid-operated valve 104b so that the second solenoid-operated valve 104b is in the ON state.

Figure 2:
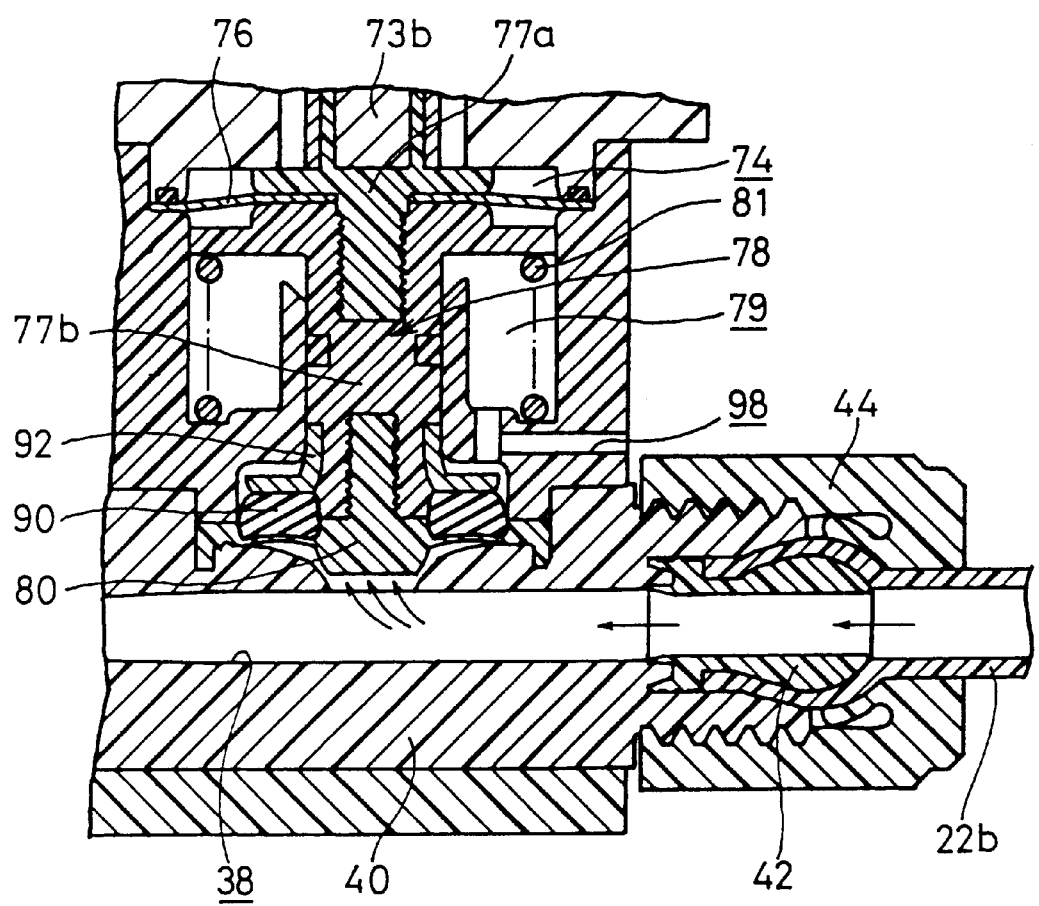
FIG. 2 shows a partial longitudinal sectional view illustrating the operation of the suck back valve shown in FIG. 1.

Therefore, owing to the fact that the first solenoid-operated valve 102b is in the OFF state and the second solenoid-operated valve 104b is in the ON state, the pressure fluid (pilot pressure) remaining in the second diaphragm chamber 74 passes through the second pilot passage 100, and it is discharged to the atmospheric air from a discharge port 138 of the second solenoid-operated valve 104b. As a result, the second diaphragm 80 is lifted upwardly in the direction of the arrow $X_1$ in accordance with the action of the resilient force of the spring member 81 to arrive at the state shown in FIG. 2.

That is, the second diaphragm 80 is raised, and the diaphragm 76 is displaced integrally in the direction of the arrow $X_1$ by the aid of the second displacement member 78. Thus, the action of negative pressure arises. During this process, a predetermined amount of the coating liquid in the fluid passage 38 is sucked in the direction indicated by the arrows shown in FIG. 2. As a result, the predetermined amount of the coating liquid remaining in the nozzle 133 of the coating liquid-dripping apparatus 132 is returned toward the suck back valve 20. Accordingly, it is possible to avoid any liquid drip toward the semiconductor wafer 131.

In this embodiment, the second sensor 33b is used to detect the displacement amount of the second diaphragm 80 which is lifted upwardly integrally with the second displacement member 78. The controller 108 makes comparison with a valve lift amount previously set by the lift amount-setting unit 114 on the basis of the detection signal sent from the second sensor 33b so that the feedback control is performed on the basis of an obtained difference (see FIG. 4).

That is, the second sensor 33b is used to detect the magnetic force of the second magnet 73b installed to the second displacement member 78 which is displaced integrally with the second diaphragm 80. Accordingly, the displacement amount (valve lift amount) of the second diaphragm 80 is detected. The displacement amount of the second diaphragm 80 corresponds to the suction amount of the coating liquid. As shown in FIG. 4, the controller 108 compares the detection signal outputted from the second sensor 33b with the valve lift amount previously set by the lift amount-setting unit 114. An obtained difference is inputted via PWM 116 into the second electropneumatic proportional valve 75b.

The second electropneumatic proportional valve 75b is operated in accordance with the energizing signal and the deenergizing signal sent from the controller 108 so that the ON state and the OFF state of the first solenoid-operated valve 102b are appropriately switched. Further, the ON state and the OFF state of the second solenoid-operated valve 104b are appropriately switched in accordance with the energizing signal and the deenergizing signal sent from the controller 108. Accordingly, the pressure in the second diaphragm chamber 74 is controlled on the basis of the difference. As a result, it is possible to reliably stop the second diaphragm 80 at the position corresponding to the suction amount of the coating liquid.

It is noted that there is a phase difference of a predetermined cycle between the energizing signal and the deenergizing signal inputted into the first solenoid-operated valve 102b and the energizing signal and the deenergizing signal inputted into the second solenoid-operated valve 104b.

When the energizing signals are sent from the controller 108 to the first electropneumatic proportional valve 75a and the second electropneumatic proportional valve 75b respectively, the state shown in FIG. 1 is given again to start the dripping of the coating liquid to the semiconductor wafer 131.

Next, description will be made with reference to FIG. 5 for the process for feedback-controlling the displacement speed of the first diaphragm 56 which functions as the valve plug of the ON/OFF valve 26.

The displacement amount (valve lift amount) of the first diaphragm 56 is detected by detecting, with the first sensor 33a, the magnetic force of the first magnet 73a installed to the first displacement member 51 which is displaced integrally with the first diaphragm 56. The detection signal, which is outputted from the first sensor 33a, is inputted via the differentiating means 113 into the controller 108.

The controller 108 compares the detection signal outputted from the first sensor 33a with a valve speed previously set by the speed-setting unit 110. An obtained difference is inputted via PWM 112 into the first electropneumatic proportional valve 75a.

The first electropneumatic proportional valve 75a is operated in accordance with the energizing signal and the deenergizing signal sent from the controller 108 so that the ON state and the OFF state of the first solenoid-operated valve 102a are appropriately switched. Further, the ON state and the OFF state of the second solenoid-operated valve 104a are appropriately switched in accordance with the energizing signal and the deenergizing signal sent from the controller 108. Accordingly, the pressure in the first diaphragm chamber 48 is controlled on the basis of the difference. As a result, it is possible to highly accurately displace the first diaphragm 56 at a preset valve speed.

The displacement speed of the first diaphragm 56 is controlled as follows. That is, the displacement speed is controlled when the first diaphragm 56 is separated from the seat section 59 to give the valve-open state as well as when the first diaphragm 56 is seated on the seat section 59 to give the valve-closed state.

As described above, in the embodiment of the present invention, the second sensor 33b is used to directly detect the displacement amount of the second diaphragm 80 corresponding to the suction amount of the coating liquid. The second electropneumatic proportional valve 75b is used to feedback-control the pilot pressure supplied to the second diaphragm chamber 74. Thus, it is possible to highly accurately control the suction amount of the coating liquid sucked by the second diaphragm 80.

In the embodiment of the present invention, the valve speed of the ON/OFF valve 26 for opening/closing the fluid passage 38 is subjected to the feedback control. Accordingly, the present invention is applicable to a variety of fluids (coating liquids) which differs, for example, in viscosity.

In the embodiment of the present invention, the joint section 24, the ON/OFF valve 26, the suck back mechanism 28, the control unit 32, and the detecting unit 35 are assembled in the integrated manner respectively. Accordingly, unlike the conventional technique described above, it is unnecessary to perform any piping connection operation between the suck back valve 20 and the fluid pressure control unit and between the suck back valve 20 and the ON/OFF valve 26. It is unnecessary to provide any exclusive space for additionally providing the fluid pressure control unit and the ON/OFF valve 26. Thus, it is possible to effectively utilize the installation space.

In the embodiment of the present invention, for example, the ON/OFF valve 26 and the control unit 32 are formed integrally with the suck back mechanism 28. Therefore, it is possible to achieve the miniaturization of the entire apparatus as compared with the case in which separately formed respective components are joined into one unit as performed in the conventional technique.

In the embodiment of the present invention, it is unnecessary to provide any piping between the suck back valve 20 and the fluid pressure control unit. Therefore, it is possible to avoid the increase in flow passage resistance.

The pressure fluid (pilot pressure), which is supplied to the suck back mechanism 28 and the ON/OFF valve 26 respectively, is commonly used, and the flow rate is controlled by the aid of the first and second electropneumatic proportional valves 75a, 75b. Accordingly, unlike the conventional technique, it is unnecessary to provide any driving unit for driving the ON/OFF valve 26. As a result, it is possible to further miniaturize the entire apparatus, and it is possible to lower the cost.

In the embodiment of the present invention, the pilot pressure, which is supplied to the ON/OFF valve 26 and the suck back mechanism 28, is controlled by the aid of the first electropneumatic proportional valve 75a and the second electropneumatic proportional valve 75b which are electrically controlled by the controller 108. In this case, it is possible to enhance the response accuracy of the second diaphragm 80 which is operated in accordance with the pilot pressure. Thus, it is possible to more quickly suck the coating liquid remaining in the fluid passage 38.

Figure 6:
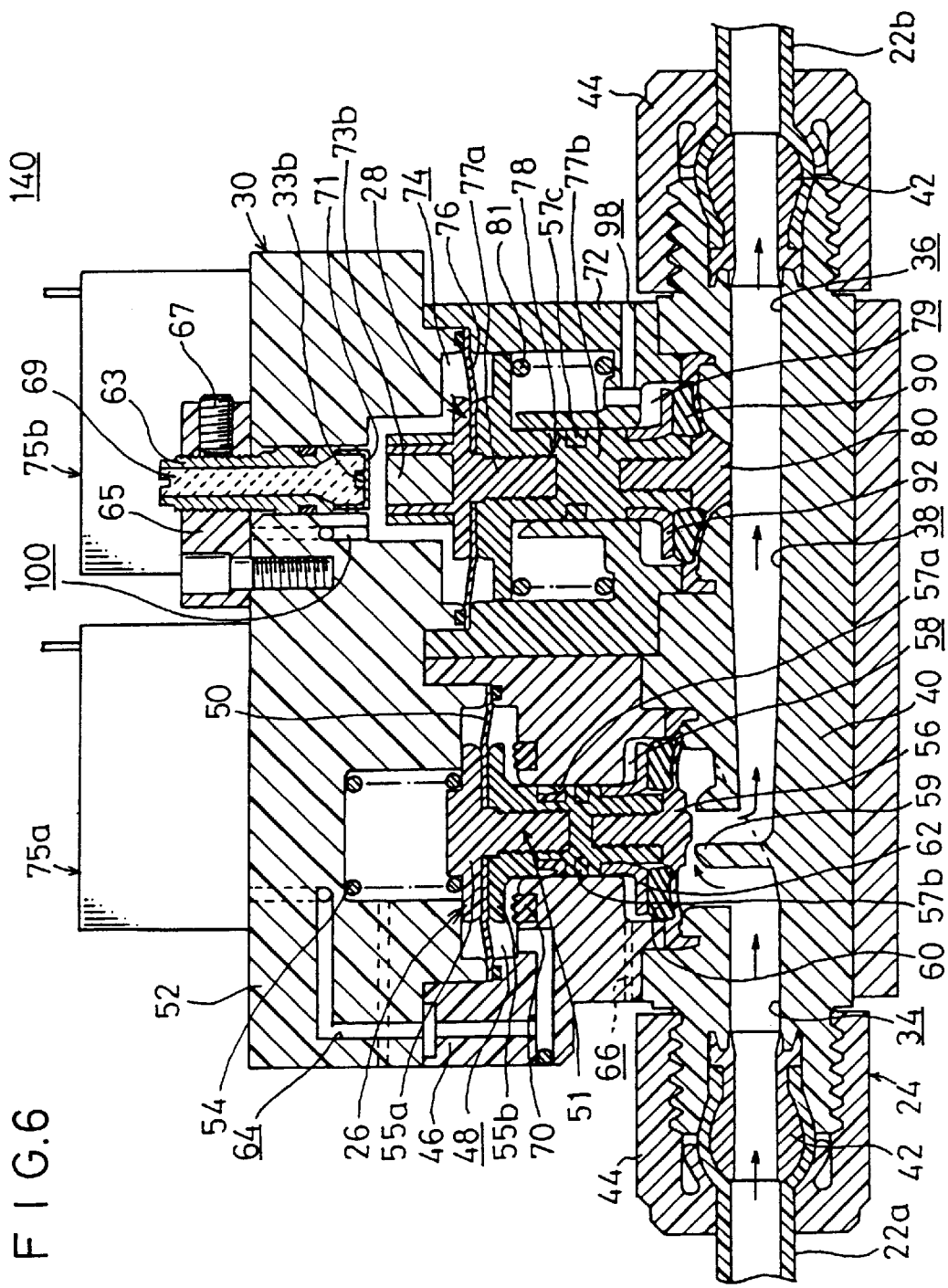
FIG. 6 shows a longitudinal sectional view illustrating a suck back valve according to another embodiment.
Figure 7:
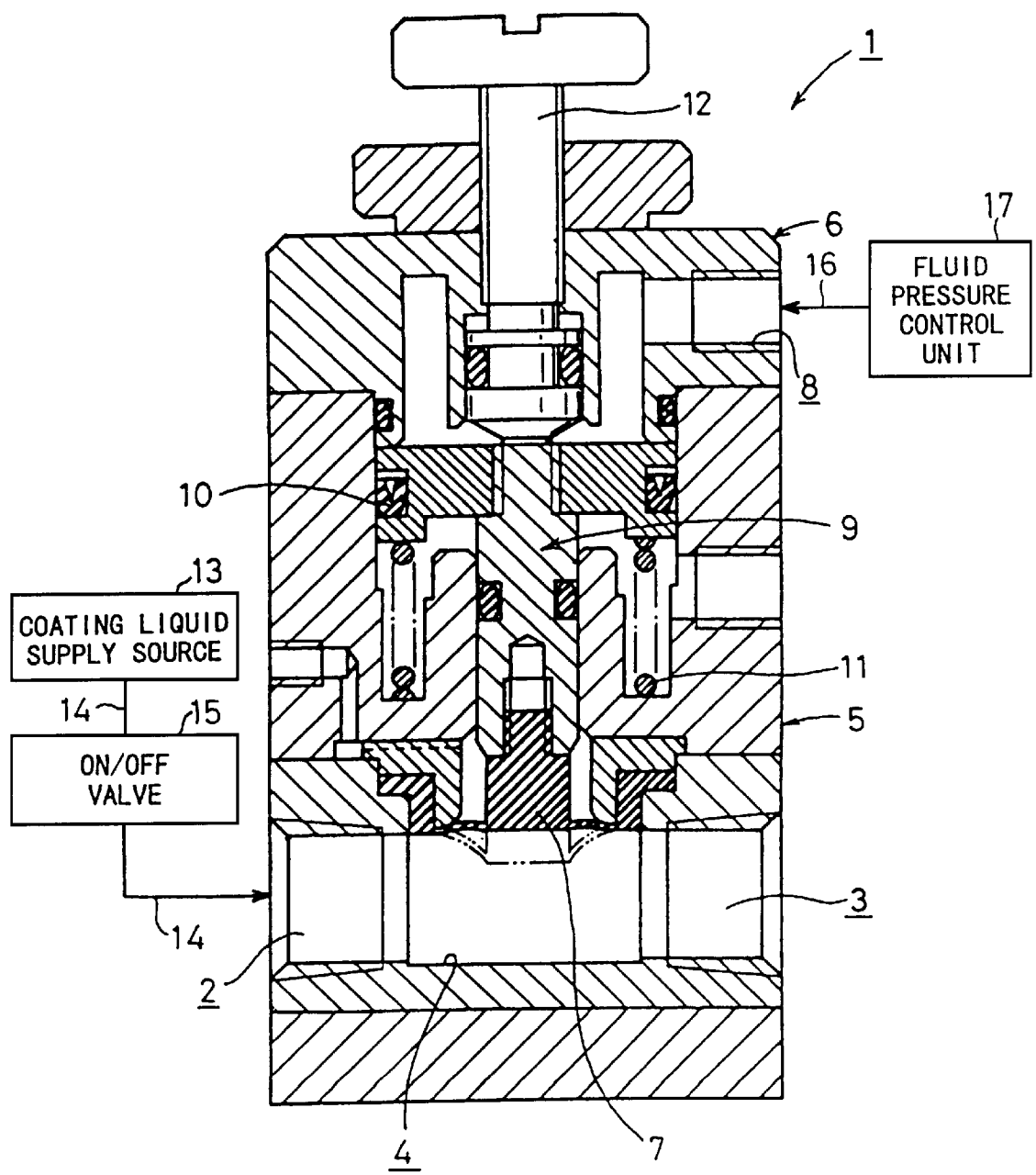
FIG. 7 shows a longitudinal sectional view illustrating the suck back valve concerning the conventional technique.

Next, a suck back valve 140 according to another embodiment is shown in FIG. 6.

The suck back valve 140 shown in FIG. 6 is different from the suck back valve 20 shown in FIG. 1 in that the suck back valve 140 is not provided with the first sensor 33a and the first magnet 73a for detecting the displacement amount of the first diaphragm 56 of the ON/OFF valve 26. The other arrangement, function, and effect are the same as those of the suck back valve 20 shown in FIG. 1, detailed explanation of which is omitted.

What is claimed is:

1. A suck back valve comprising:
   a joint section having a fluid passage and including a first port formed at one end and a second port formed at the other end;
   a suck back mechanism for sucking a pressure fluid in said fluid passage in accordance with an action of negative pressure effected by a flexible member which is displaceable in accordance with a pilot pressure;
   an ON/OFF valve for opening/closing said fluid passage in accordance with an action of said pilot pressure;
   a first displacement amount-detecting mechanism for detecting a displacement amount of said flexible member;
   a second displacement amount-detecting mechanism for detecting a displacement amount of said ON/OFF valve; and
   a control unit including a suction amount control mechanism for comparing a detection signal sent from said first displacement amount-detecting mechanism with a preset displacement amount to electrically control a flow rate of said pressure fluid sucked by said suck back mechanism, and a speed control mechanism for comparing a detection signal sent from said second displacement amount-detecting mechanism with a preset valve displacement speed so that said pilot pressure supplied to said ON/OFF valve is controlled to control a valve displacement speed of said ON/OFF valve.

2. The suck back valve according to claim 1, wherein said speed control mechanism includes a spring member for pressing a valve plug for opening/closing said fluid passage in accordance with an action of resilient force, and a first electropneumatic proportional valve for controlling said pilot pressure supplied to said ON/OFF valve in accordance with an energizing signal and a deenergizing signal sent from said control unit.

3. The suck back valve according to claim 2, wherein said first electropneumatic proportional valve includes a first solenoid-operated valve for air supply and a second solenoid-operated valve for air discharge.

4. The suck back valve according to claim 1, wherein said suction amount control mechanism includes a spring member for pressing said flexible member in accordance with an action of resilient force, and a second electropneumatic proportional valve for controlling said pilot pressure supplied to said suck back mechanism in accordance with an energizing signal and a deenergizing signal sent from said control unit.

5. The suck back valve according to claim 4, wherein said second electropneumatic proportional valve includes a first solenoid-operated valve for air supply and a second solenoid-operated valve for air discharge.

6. The suck back valve according to claim 1, wherein said first displacement amount-detecting mechanism includes a first magnet provided on one end side along an axial direction of a valve plug for opening/closing said fluid passage, for making displacement integrally with said valve plug, and a first sensor for detecting magnetic force of said first magnet.

7. The suck back valve according to claim 1, wherein said second displacement amount-detecting mechanism includes a second magnet provided on one end side along an axial direction of said flexible member, for making displacement integrally with said flexible member, and a second sensor for detecting magnetic force of said second magnet.

8. The suck back valve according to claim 1, wherein said flexible member is composed of a diaphragm.

9. The suck back valve according to claim 1, wherein said suck back mechanism includes a diaphragm for making displacement in accordance with an action of said pilot pressure supplied from a pressure fluid supply port, a displacement member provided displaceably in a valve body, for making displacement integrally with said diaphragm, another diaphragm coupled to one end of said displacement member, for making displacement together with said displacement member to effect said action of negative pressure, and a spring member for energizing said displacement member in a predetermined direction.

10. The suck back valve according to claim 1, wherein said joint section, said suck back mechanism, said ON/OFF valve, and said control unit are provided and assembled in an integrated manner respectively.

11. A suck back valve comprising:
   a joint section having a fluid passage and including a first port formed at one end and a second port formed at the other end;
   a suck back mechanism for sucking a pressure fluid in said fluid passage in accordance with an action of negative pressure effected by a flexible member which is displaceable in accordance with a pilot pressure;
   an ON/OFF valve for opening/closing said fluid passage in accordance with an action of said pilot pressure;
   a displacement amount-detecting mechanism for detecting a displacement amount of said flexible member;
   a speed setting unit for controlling a displacement speed of said ON/OFF valve during opening/closing of said fluid passage; and
   a control unit including a suction amount control mechanism for comparing a detection signal sent from said displacement amount-detecting mechanism with a preset displacement amount to electrically control a flow rate of said pressure fluid sucked by said suck back mechanism.

12. The suck back valve according to claim 11, wherein said suction amount control mechanism includes a spring member for pressing said flexible member in accordance with an action of resilient force, and an electropneumatic proportional valve for controlling said pilot pressure supplied to said suck back mechanism in accordance with an energizing signal and a deenergizing signal sent from said control unit.

13. The suck back valve according to claim 11, wherein said joint section, said suck back mechanism, said ON/OFF valve, and said control unit are provided and assembled in an integrated manner respectively.

14. The suck back valve according to claim 11, wherein said flexible member is composed of a diaphragm.

15. The suck back valve according to claim 11, wherein said suck back mechanism includes a diaphragm for making displacement in accordance with an action of said pilot pressure supplied from a pressure fluid supply port, a displacement member provided displaceably in a valve body, for making displacement integrally with said diaphragm, another diaphragm coupled to one end of said displacement member, for making displacement together with said displacement member to effect said action of negative pressure, and a spring member for energizing said displacement member in a predetermined direction.

* * * * *